(12) United States Patent
Fujita et al.

(10) Patent No.: US 8,207,839 B2
(45) Date of Patent: Jun. 26, 2012

(54) APPARATUS, METHOD AND PROGRAM FOR DETECTING TIRE HAVING DECREASED PRESSURE USING BAYESIAN ESTIMATION MEANS

(75) Inventors: Hajime Fujita, Nishinomiya (JP); Hiroaki Kawasaki, Ashiya (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 333 days.

(21) Appl. No.: 12/652,243

(22) Filed: Jan. 5, 2010

(65) Prior Publication Data
US 2010/0225463 A1 Sep. 9, 2010

(30) Foreign Application Priority Data
Mar. 6, 2009 (JP) ................................ 2009-053654

(51) Int. Cl.
*G08B 21/00* (2006.01)

(52) U.S. Cl. ........................ 340/443; 340/442; 73/146.2

(58) Field of Classification Search .......... 340/442–444; 73/146.2–146.5
See application file for complete search history.

(56) References Cited

U.S. PATENT DOCUMENTS

| | | | |
|---|---|---|---|
| 2004/0017289 A1 | 1/2004 | Brown, Jr. | |
| 2004/0260436 A1 | 12/2004 | Kin | |
| 2009/0040095 A1 | 2/2009 | Ogawa | |

FOREIGN PATENT DOCUMENTS

| | | | |
|---|---|---|---|
| EP | 1384604 A1 | 1/2004 | |
| EP | 2 130 693 A1 | 12/2009 | |
| JP | 6-183230 A | 7/1994 | |
| JP | 8-63581 A | 3/1996 | |
| JP | 9-20111 A | 1/1997 | |
| JP | 2004-58998 A | 2/2004 | |
| JP | 2007-155525 A | 6/2007 | |
| JP | 2009-42181 A | 2/2009 | |

*Primary Examiner* — Jeffery Hofsass
(74) *Attorney, Agent, or Firm* — Birch, Stewart, Kolasch & Birch, LLP

(57) ABSTRACT

An apparatus for detecting a tire having a decreased pressure based on resonance frequency of tires attached to respective wheels of a vehicle. The apparatus includes a storage means for storing information regarding a distribution of resonance frequencies respectively corresponding to a plurality of air pressure statuses, an initialization means for estimating a frequency characteristic of the rotation speed information or the rotation acceleration information, a frequency estimation means for estimating a frequency characteristic of the rotation speed information or the rotation acceleration information of a running vehicle, and a Bayesian estimation means for subjecting a tire pressure status at a certain time to a Bayesian estimation based on the resonance frequency during the initialization, a resonance frequency at the certain time obtained from the frequency estimation means, and distribution-related information stored in the storage means.

9 Claims, 7 Drawing Sheets

APPARATUS, METHOD AND PROGRAM FOR DETECTING TIRE HAVING DECREASED PRESSURE USING BAYESIAN ESTIMATION MEANS

TECHNICAL FIELD

The present invention relates to an apparatus and a method for detecting a tire having a decreased pressure, and a program for detecting a tire having a decreased pressure by which a tire having a decreased pressure is detected based on the resonance frequency of the tire of a running vehicle.

BACKGROUND ART

One of factors required to allow an automobile to run safely is a tire air pressure. When the air pressure is lower than an appropriate value, the stable maneuverability or fuel consumption is deteriorated, which may cause a tire burst. Thus, Tire Pressure Monitoring System (TPMS) for detecting a tire having a decreased pressure to send an alarm to the driver to prompt an appropriate action is an important technique from the viewpoint of environment protection and driver safety.

A conventional alarm apparatus can be classified into two types of the direct detection-type one (direct TPMS) and the indirect detection-type one (indirect TPMS). The direct TPMS provides a pressure sensor in a tire wheel to thereby directly measure the tire pressure. The direct TPMS can detect a decrease in the pressure at a high accuracy but requires exclusive wheels and has a problematic fault-tolerance performance in an actual environment. Thus, the direct TPMS is still disadvantageous in the technical and cost aspects.

On the other hand, the indirect TPMS is a method of estimating the air pressure based on the tire rotation information. The indirect TPMS can be further classified into the Dynamic Loaded Radius (DLR) method and the Resonance Frequency Mechanism (RFM) method. The DLR method is a method that uses a phenomenon according to which a tire having a decreased pressure in a running vehicle is collapsed and thus the tire has a reduced dynamic loaded radius and is consequently rotated at a higher speed than other tires having a normal pressure. The DLR method compares the rotation rates of the four tires to thereby detect a tire having a decreased pressure. Since this method can use only wheel rotation speed signals obtained from a wheel speed sensor to subject the signals to a relatively-easy computation processing, this method has been widely researched mainly for the purpose of detecting a puncture of one wheel. However, this method merely makes a relative comparison among wheel rotation speeds and thus cannot detect a case of four wheels simultaneous deflation (natural leakage).

Furthermore, a disadvantage is caused where a decreased pressure cannot be accurately detected through all running conditions because a difference in the wheel speed is caused also by running conditions such as the turning of the vehicle, the acceleration and deceleration, and an eccentric load.

On the other hand, the RFM method is a method to use a fact that a tire having a decreased pressure has a different wheel speed signal frequency characteristic to thereby detect a difference from a normal pressure. In contrast with the DLR method, the RFM method is an absolute comparison with the normal values of the respective wheels that are retained in advance. Thus, the RFM method also can detect a case of four wheels simultaneous deflation.

Thus, the RFM method attracts attentions as a better indirect detection method. However, the RFM method has a disadvantage where some running conditions cause strong noise for example and thus an estimated frequency value of a target domain is not robust against the vehicle speed and the road surface situation for example. The present invention relates to an apparatus for detecting a tire status based on the RFM method. Hereinafter, the basic principle of this method will be described in more detail.

When the vehicle is running, the tires receive a force from the road surface to thereby cause the torsional motion in the front-and-rear direction and the front-and-rear motion of the suspension, and these motions have a coupled resonance vibration. Since this resonance phenomenon also has an influence on the wheel rotation motion, a wheel speed signal obtained from a wheel sensor provided in the Anti-Lock Braking System (ABS) also includes information related to the resonance phenomenon. Furthermore, since the coupled resonance vibration is caused in a unique vibration mode due to the tire torsional rigidity, the excitation status thereof changes so as to depend only on a change in the air pressure constituting the tire physical characteristic and has a very small dependence on a change in the vehicle speed and a change in the road surface. Specifically, a decreased air pressure causes a change in the dynamics of the tire torsional motion. Thus, when the wheel speed signal is subjected to a frequency analysis, a peak of the coupled resonance vibration (resonance peak) appears at the lower frequency-side in the case of a decreased pressure than in the case of a normal pressure.

FIG. 3 illustrates the result of the analysis by Fast Fourier Transform (FFT) of tire vibrations when the air pressure status is a normal pressure (221 kPa), a 15%-decreased pressure from the normal pressure (188 kPa), a 25%-decreased pressure (166 kPa), and a 40%-decreased pressure (133 kPa). It can be seen that a frequency corresponding to peak values existing in the vicinity of 25 to 30 Hz (resonance frequency) moves to the lower frequency-side due to a change in the internal pressure. This phenomenon appears to be independent, due to the above-described characteristic, from the tire type and the vehicle type, the running speed, and the road surface situation for example. Thus, the RFM method focuses on this resonance frequency and issues an alarm when the frequency is relatively lower than a reference frequency estimated during initialization. Thus, the resonance frequency must be estimated based on wheel speed signals obtained from the ABS. However, since it is difficult to store time-series data in an in-vehicle calculator having a limited calculation resource, a difficulty is caused in performing the frequency analysis based on FFT. Due to this reason, the conventional method was to estimate a resonance frequency by an on-line method described below.

Since wheel speed signals are obtained as time-series data at the respective times, the data is subjected to a time-series analysis based on the K-order Autoregressive (AR) model. Specifically, parameters $\theta = \{a_1, \ldots, a_K\}$ in a model represented by the following formula (1) are estimated by the Kalman filter (iterative least squares technique).

$$y(t) = \sum_{i=1}^{K} a_i y(t-i) + \varepsilon \quad (1)$$

In the formula, y (t) represents a wheel speed at the time t, $\varepsilon$ represents white noise, and K represents the order of the model (K=2 can be established when a quadratic model is assumed in order to express a phenomenon such as vibration).

A frequency corresponding to a pole of a transfer function representing an AR model is estimated as a resonance frequency. Thus, if the resonance peak can be correctly extracted based on the model, the resonance frequency can be obtained correctly.

By the way, the Tire Pressure Monitoring System must make, based on the sequence of resonance frequencies estimated at the respective times by the conventional method for example, a final determination as to whether a tire has a decreased pressure or not. Even when the resonance frequency is estimated correctly, the determination regarding the decreased pressure has two problems as described below.

First, some types of tires and vehicles show a small difference in the resonance frequency between a normal pressure and a decreased pressure (hereinafter, this difference will be called "pressure decrease sensitivity". However, this difference intends to mean, when the term "resonance frequency" herein means not a true resonance frequency but frequencies estimated by the above system such as the AR model, a difference in the average values of the distribution thereof. Attention must be paid on the point that individual tires have different tire resonance frequencies due to a production tolerance for example even when the tires have the same brand and on the point that, regardless of the true resonance frequency, the estimate values are dispersed within an estimate dispersion range due to an influence by noise or the like). In this case, when the pressure decrease sensitivity is lower than the dispersion of the resonance frequencies, it is difficult to carry out the determination of a decreased pressure accurately. Specifically, there has been a conventionally-used method of determining a decreased pressure to issue an alarm when a difference between a reference frequency estimated during initialization and a resonance frequency estimated at the current time is larger than a difference amount set in advance. However, when standard deviation of the distribution of resonance frequencies estimated at a normal pressure is 1 Hz with regard to a tire having a pressure decrease sensitivity of 3 Hz, any set difference amount may cause a failure to issue an alarm when a low reference frequency is set due to the dispersion of running conditions. There is also a possibility of a false alarm when a high reference frequency is set. In other words, when the distribution of estimate resonance frequencies at a normal pressure is superposed on the skirt of the distribution at a decreased pressure, it is difficult to make an accurate determination in a unique manner. In such a case, a measure may be considered to reject the estimate result to pass on the determination of a decreased pressure for example. However, this is not a substantial solution and thus may cause an inconvenience depending on running conditions.

Secondly, commercially-available passenger vehicles are generally specified to have default tires of a plurality of brands. These tires have different tread patterns, inch sizes, and tire profiles or the like from one another. The different tire properties as described above cause a difference in the pressure decrease sensitivity and the resonance frequency under the respective air pressure conditions. However, with regard to vehicles attached with any of the default tires (which tire is attached to the vehicle is unknown to the system), a decreased tire pressure must be detected by a single alarm system. Therefore, in the stage of the initialization (which means a procedure given to the system for a fixed period of time after the air pressure adjustment to store a resonance frequency in the normal air pressure status), it is required to determine which default tires are attached to the vehicle and to consider the properties different depending on the tire in the stage of determining a decreased tire pressure.

When the above two problems simultaneously occur (e.g., when a plurality of default tires have highly-dispersed resonance frequencies or pressure decrease sensitivities), the determination of a decreased pressure is particularly difficult, which has been a significant disadvantage hindering the practical use of an air pressure alarm system based on the RFM method.

SUMMARY OF INVENTION

Technical Problem

The present invention has been made in view of the situation as described above. It is an object of the present invention to effectively solve the difficult disadvantages as described above to provide a method and an apparatus for detecting a tire having a decreased pressure, and a program for detecting a tire having a decreased pressure by which the determination of a decreased pressure can be accurately carried out even when tires have a small pressure decrease sensitivity or a plurality of default tires have highly-dispersed resonance frequencies or pressure decrease sensitivities.

Solution to Problem

In accordance with a first aspect of the present invention, there is provided an apparatus for detecting a tire having a decreased pressure of the present invention (hereinafter simply also referred to as "detection apparatus") based on resonance frequency of tires attached to respective wheels of a vehicle, characterized in comprising:

a storage means for storing information regarding a distribution of resonance frequencies respectively corresponding to a plurality of air pressure statuses, the distribution being learned in advance, an initialization means for estimating, based on rotation speed information or rotation acceleration information regarding the tires at a normal internal pressure, a frequency characteristic of the rotation speed information or the rotation acceleration information, a frequency estimation means for estimating, based on rotation speed information or rotation acceleration information regarding the tires in an running vehicle, a frequency characteristic of the rotation speed information or the rotation acceleration information, and a Bayesian estimation means for subjecting a tire pressure status at a certain time to a Bayesian estimation based on the resonance frequency during the initialization, a resonance frequency at the certain time obtained from the frequency estimation means, and distribution-related information stored in the storage means.

According to the detection apparatus of the present invention, the distribution-related information learned in advance regarding the distribution of resonance frequencies respectively corresponding to a plurality of air pressure statuses (e.g., average and dispersion of normal distribution) is stored. The Bayesian estimation means is used to subject a tire pressure status at a certain time to Bayesian estimation based on the resonance frequency during the initialization, a resonance frequency at the certain time obtained from the frequency estimation means, and distribution-related information stored in the storage means. Thus, even when tires have a small pressure decrease sensitivity or a plurality of default tires have highly-dispersed resonance frequencies or pressure decrease sensitivities, the determination of a decreased pressure can be carried out accurately.

In accordance with a second aspect of the present invention, there is provided a method of detecting a tire having a decreased pressure of the present invention (hereinafter also referred to as "detection method") based on resonance frequency of tires attached to respective wheels of a vehicle, characterized in comprising:

a step of storing information regarding distribution of resonance frequencies respectively corresponding to a plurality of air pressure statuses, the distribution being learned in advance, an initialization step of estimating, based on rotation speed information or rotation acceleration information regarding the tires at a normal internal pressure, a frequency characteristic of the rotation speed information or the rotation acceleration information, a frequency estimation step of estimating, based on rotation speed information or rotation acceleration information regarding the tires in a running vehicle, a frequency characteristic of the rotation speed information or the rotation acceleration information, and a Bayesian estimation step of subjecting a tire pressure status at a certain time to a Bayesian estimation based on the resonance frequency during the initialization, a resonance frequency at the certain time obtained from the frequency estimation means, and the distribution-related information stored in the storage step.

In accordance with a third aspect of the present invention, there is provided a program for detecting a tire having a decreased pressure is characterized in causing, in order to detect a tire having a decreased pressure based on the resonance frequency of the tires attached to the respective wheels of a vehicle, a computer to function as: a storage means for storing information regarding a distribution of resonance frequencies respectively corresponding to a plurality of air pressure statuses, the distribution being learned in advance; an initialization means for estimating, based on rotation speed information or rotation acceleration information regarding the tires at a normal internal pressure, a frequency characteristic of the rotation speed information or the rotation acceleration information; a frequency estimation means for estimating, based on rotation speed information or rotation acceleration information regarding the tires in a running vehicle, a frequency characteristic of the rotation speed information or the rotation acceleration information; and a Bayesian estimation means for subjecting a tire pressure status at a certain time to a Bayesian estimation based on the resonance frequency during the initialization, a resonance frequency at the certain time obtained from the frequency estimation means, and distribution-related information stored in the storage means.

ADVANTAGEOUS EFFECTS OF INVENTION

According to a method and an apparatus for detecting a tire having a decreased pressure, and a program for detecting a tire having a decreased pressure of the present invention, the determination of a decreased pressure can be carried out accurately even when the tires have a small pressure decrease sensitivity or a plurality of default tires have highly-dispersed resonance frequencies or pressure decrease sensitivities.

DESCRIPTION OF EMBODIMENTS

Hereinafter, with reference to the attached drawings, the following section will describe in detail embodiments of a method and an apparatus for detecting a tire having a decreased pressure, and a program for detecting a tire having a decreased pressure of the present invention.

Figure 1:
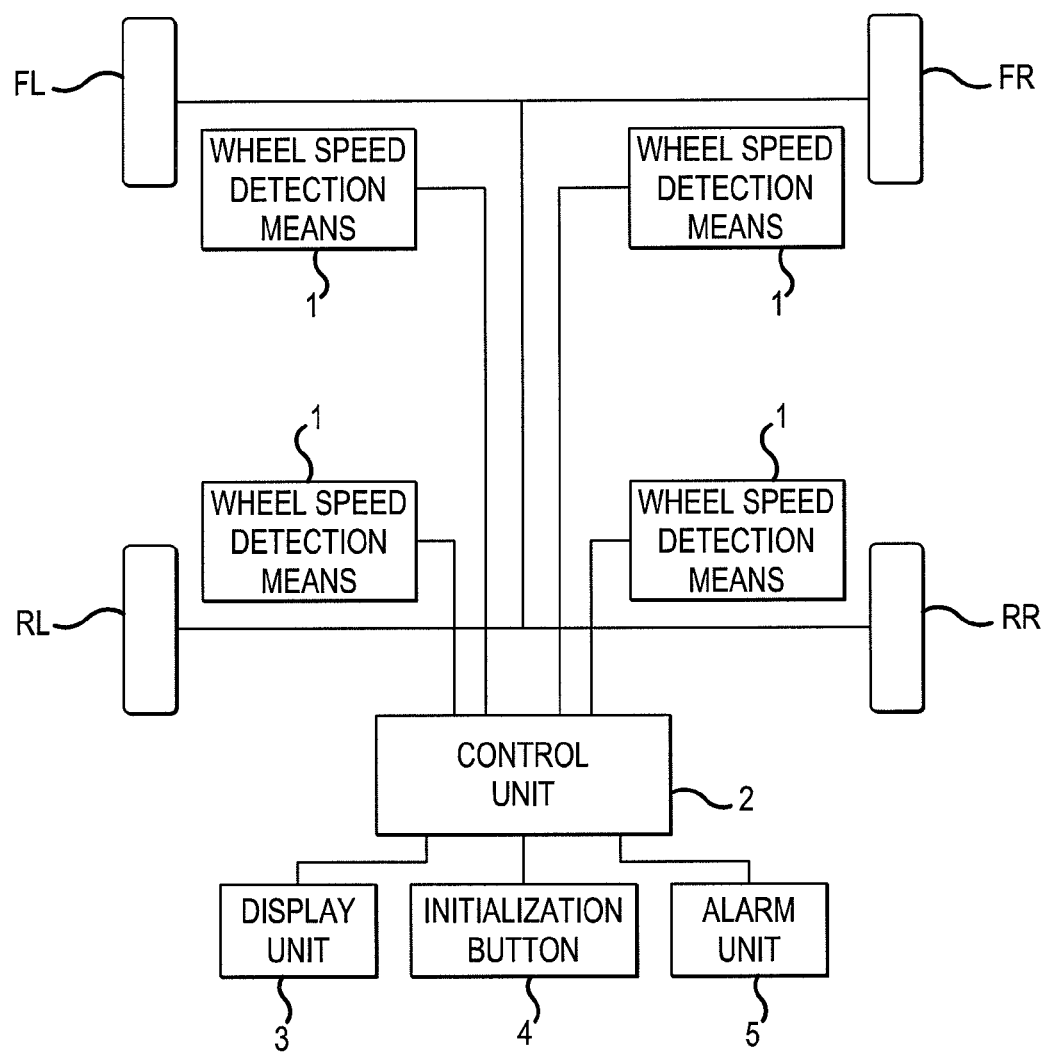
FIG. 1 is a block diagram illustrating one embodiment of a detection apparatus of the present invention.

As shown in FIG. 1, a detection apparatus according to one embodiment of the present invention includes normal wheel speed detection means (rotation speed information detection means) 1 in order to detect the rotation speed information of a left front wheel (FL), a right front wheel (FR), a left rear wheel (RL), and a right rear wheel (RR) of four tires attached to a four-wheel vehicle. The wheel speed detection means 1 is provided so as to be associated with the respective tires.

The wheel speed detection means 1 can be, for example, a wheel speed sensor that uses an electromagnetic pick up or the like to generate a rotation pulse to measure, based on the number of pulses, a rotation angular velocity and a wheel speed or an angular velocity sensor that uses the rotation as in dynamo to generate power to measure, based on this voltage, a rotation angular velocity and a wheel speed. The output from the wheel speed detection means 1 is given to a control unit 2 that is a computer such as ABS. This control unit 2 is connected, for example, to a display unit 3 configured by a liquid crystal display element, a plasma display element, CRT or the like for displaying a tire having a decreased pressure, an initialization button 4 that can be operated by a driver, and an alarm unit 5 for notifying a driver of a tire having a decreased pressure.

Figure 2:
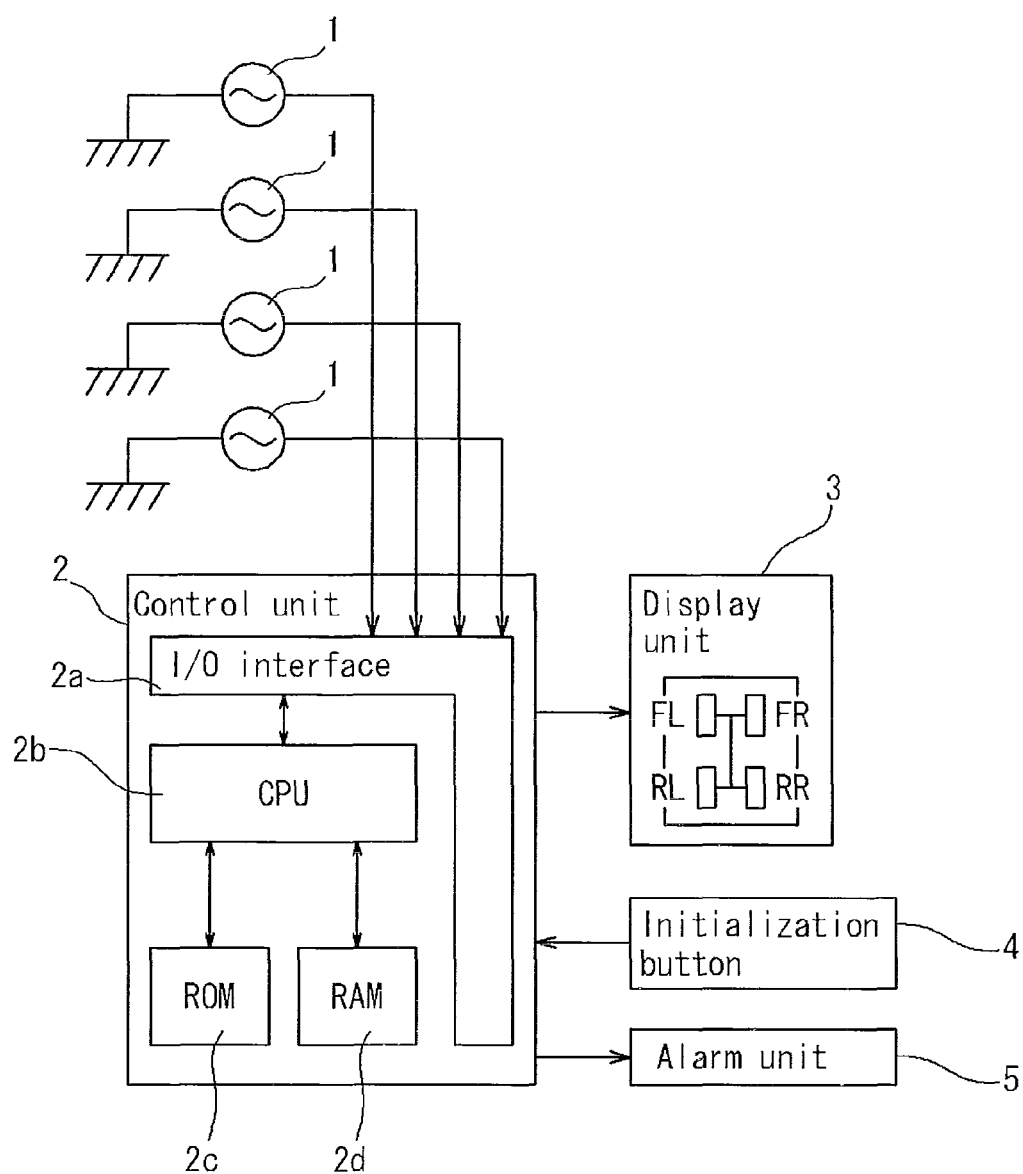
FIG. 2 is a block diagram illustrating an electrical configuration of the detection apparatus shown in FIG. 1.
Figure 3:
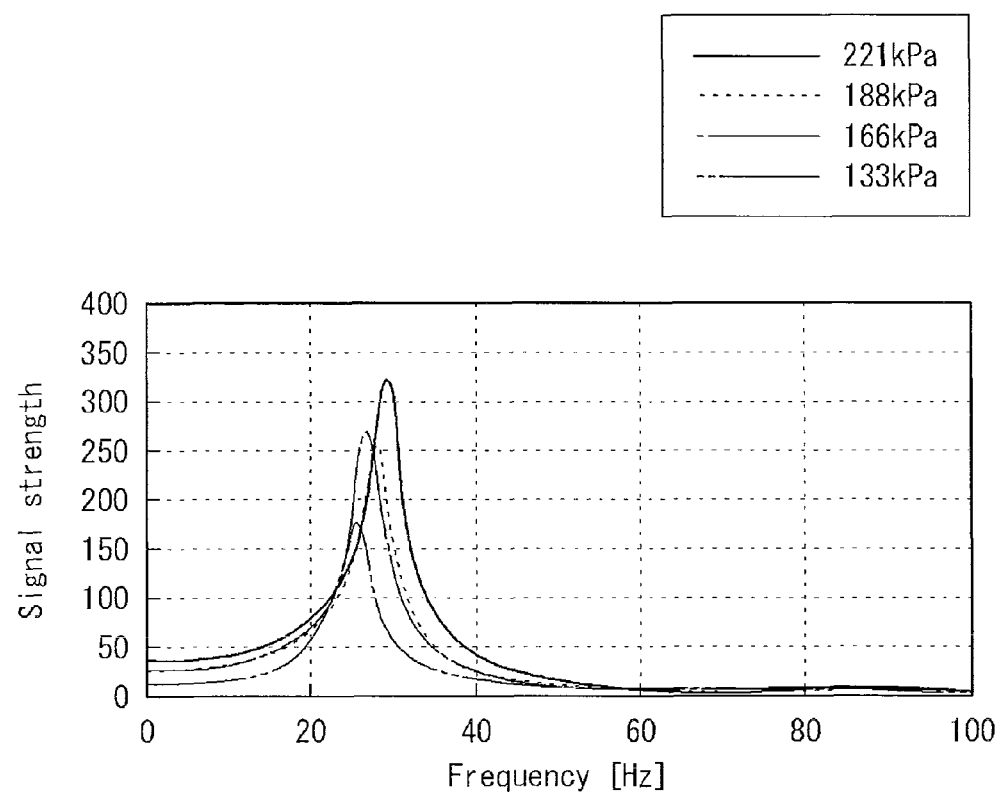
FIG. 3 illustrates how a tire resonance frequency changes due to a decreased pressure.

As shown in FIG. 2, the control unit 2 is composed of: an I/O interface 2a required for exchanging signals with an external apparatus; a CPU 2b functioning as a center of the computation processing; a ROM 2c storing therein a control operation program of the CPU 2b; and a RAM 2d in which data is temporarily written when the CPU 2b performs a control operation and from which the written data is read out. The ROM 2c also functions as a storage means for storing a learning result which will be described later (a result of learning a distribution of resonance frequencies respectively corresponding to a plurality of air pressure statuses in advance by an experiment running or the like).

The wheel speed detection means 1 outputs a pulse signal corresponding to the number of rotations of a tire (hereinafter also referred to as "wheel speed pulse"). Then, this wheel speed pulse can be sampled at a predetermined sampling cycle $\Delta T$ (second) of $\Delta T=0.005$ seconds for example to thereby obtain the time-series data of wheel speed signals.

The detection apparatus according to the present embodiment is mainly composed of: the wheel speed detection means (rotation speed information detection means) 1; a frequency estimation means for estimating, based on the rotation speed information obtained from the wheel speed detection means or a rotation acceleration information computed from the rotation speed information, a frequency characteristic of the rotation speed information or the rotation acceleration information; a storage means for storing the result of learning in advance the distribution of resonance frequencies respectively corresponding to a plurality of air pressure statuses; an initialization means for estimating, based on rotation speed information or rotation acceleration information regarding the tires at a normal internal pressure, a frequency characteristic of the rotation speed information or the rotation acceleration information; and a Bayesian estimation means for subjecting a tire pressure status at a certain time to a Bayesian estimation based on the resonance frequency during the initialization, a resonance frequency at the certain time obtained from the frequency estimation means, and the learning result stored in the storage means. A program for detecting a tire having a decreased pressure causes the control unit 2 to function as the frequency characteristic estimation means, the storage means, the initialization means, and the Bayesian estimation means.

The detection method of the present invention is based on a probabilistic estimation method called "Bayesian estimation". This method is a probabilistic method for estimating a phenomenon causing the observation based on the resultant observation information (in other words, a framework handling the so-called inverse problem by a probabilistic method) and has been conventionally reported in many examples of the technological applications. For example, a simple example is a "Bayesian spam filter" for determining whether a received e-mail is a non-junk mail or a junk mail. By allowing a user to give a system the collection of non-junk mails and the collection of junk mails as a learning data set so that the system can learn in advance a causal relation between a cause and the observation (generally called "likelihood function"), the system can estimate the origin of a new unknown mail. Thus, if a mail is estimated to be a junk mail at a high probability, the mail can be subjected to a desirable processing such as discarding. The similar framework also has been used for tools for evaluating false-positive results based on genes extracted from a patient who has a possibility of a cancer to thereby support a medical determination and the prognostic prediction, and for individual identification tools based on face images and the like. Furthermore, a fact has been widely known that the Kalman filter widely used in the engineering field is equivalent to a method of sequentially performing the Bayesian estimation when the likelihood function has a normal distribution (generally called "sequential Bayesian estimation"). Furthermore, a method also has been known to estimate, based on the resultant observation information, a causal relation network existing at the background (generally called "Bayesian network") for example. The framework and derivative technologies have been widely known for a long time and have many academic documents and descriptions.

On the other hand, in the Tire Pressure Monitoring System, as an algorithm for the determination of a decreased pressure, a method has been used to issue an alarm when a difference between a reference frequency estimated at the initialization and a resonance frequency estimated at the current time exceeds a difference amount set in advance. However, as described above, the simple deterministic method as described above cannot cope with some actual cases. Thus, such a probabilistic method is required to make an optimal determination in consideration of uncertainties to a plurality of possibilities based on the probability distribution.

When assuming that a resonance frequency estimated at the time t is $\omega_t$, the air pressure status is $s_t$, the type of attached tires is $z$, the sequence of resonance frequencies at the initialization obtained from the time 1 to t is $h_t^{STD} = \{\omega_1^{STD}, \ldots, \omega_t^{STD}\}$, and the sequence of resonance frequencies at the detection obtained from the time 1 to t is $h_t = \{\omega_1, \ldots, \omega_t\}$, then the posterior probability $p(s_t|h_t, h_T^{STD})$ regarding the air pressure status $s_t$ to be obtained in the present invention is sequentially calculated as shown below.

$$p(s_{t+1} | h_{t+1}, h_T^{STD}) = \sum_z p(s_{t+1} | z, h_{t+1}, h_T^{STD}) p(z | h_t^{STD}) \quad (2)$$

$$p(s_{t+1} | z, h_{t+1}, h_T^{STD}) = \frac{p(\omega_{t+1} | s_{t+1}, z) p(s_{t+1} | z, h_t, h_T^{STD})}{p(h_{t+1})} \quad (3)$$

$$= \frac{p(\omega_{t+1} | s_{t+1}, z) \sum_{s_t} p(s_{t+1} | s_t) p(s_t | z, h_t, h_T^{STD})}{p(h_{t+1})}$$

$$p(z | h_{t+1}^{STD}) = \frac{p(\omega_{t+1}^{STD} | z) p(z | h_t^{STD})}{p(h_{t+1}^{STD})} \quad (4)$$

Specifically, at the initialization, the distribution $p(z|h_T^{STD})$ of the tires is sequentially calculated based on the formula (4). At the detection, the probability $p(s_t|h_t, h_T^{STD})$ regarding the air pressure status $s_t$ when assuming that the respective tires are attached is obtained.

Then, regarding the two likelihood functions $p(\omega_t|s_t, z)$, $p(\omega_t^{STD}|z)$ appearing in the formulae (3) and (4), an appropriate parametric distribution is assumed and the parameters of the distribution are determined in advance based on the experiment data extracted from an actual vehicle test for example.

However, since it is difficult to calculate the denominator appearing in both of the formulae, the Kalman filter must be used by assuming the normal distribution in the likelihood function or an appropriate approximate calculation method (e.g., a particle filter or the variational Bayesian method) must be used. In the present embodiment, the Kalman filter is used to obtain a desired posterior distribution analytically. Although the normal distribution is assumed for the likelihood function, it is empirically known that resonance frequency estimate values have a normal distribution around the true tire resonance frequency as a center with a certain range of dispersion. Thus, this assumption is reasonable.

Now, it is assumed that an average of the distribution of resonance frequencies at the normal pressure of the respective tires is $\mu_{NP}^i$, the standard deviation is $\sigma_{NP}^i$, an average of the distribution of resonance frequencies at a decreased pressure is $\mu_{Def}^i$ and the standard deviation is $\sigma_{Def}^i$ (NP is an abbreviation of Normal Pressure and Def is an abbreviation of Deflation). Here, i(i=1, ..., M) is an index regarding the tire type z. The above statistic amount is determined in advance to have an optimal value based on the experiment data for example.

At the initialization, by assuming that the resonance frequency $\omega_t^{STD}$ is obtained at the time t(t=1, ..., T), the following Kalman filter algorithm is carried out.

$K = PC'(CPC' + R)^{-1}$ $x \leftarrow x + K(\omega_t^{STD} - Cx)$ $P \leftarrow P - KCP$ In the formula, x is a M×1 internal status vector, P is a M×M variance-covariance matrix, C is an M×M diagonal matrix having $(\mu^1_{NP}, \mu^2_{NP}, \ldots, \mu^M_{NP})$ as an on-diagonal element. R is an M×M diagonal matrix having $(\sigma^1_{NP}, \sigma^2_{NP}, \ldots, \sigma^M_{NP})$ as an on-diagonal element. K is a Kalman gain. Then, based on $x=(x^1_{NP}, \ldots, x^M_{NP})$ assumed by obtaining the resonance frequency sequence by the final time $h_T^{STD}=\{\omega_1^{STD}, \ldots, \omega_T^{STD}\}$, the probability at which a tire is attached $p(z|h_T^{STD})$ is calculated in the manner as shown below.

$$p(z|h_T^{STD}) = \frac{1}{z} N(\overline{\omega} x^i_{NP}; \mu^i_{NP}, \sigma^{i2}_{NP}) \qquad (5)$$

In the formula, $\overline{\omega}$ is an average value of resonance frequencies obtained at the initialization and N shows a normal distribution. Z is a regularization term and is normalized so as to be 1 by summing up to all i(i=1, . . . , M).

At the detection, based on the assumption that the resonance frequency $\omega_t$ is obtained at the time t(t=1, . . . ), the same Kalman filter algorithm as the above is carried out. However, x is a 2M×1 internal status vector, P is a 2M×2M variance-covariance matrix. C is an 2M×2M diagonal matrix having $(\mu^1_{NP}, \mu^1_{Def}, \ldots, \mu^M_{NP}, \mu^M_{Def})$ as an on-diagonal element. R is an 2M×2M diagonal matrix having $(\sigma^1_{NP}, \sigma^1_{Def}, \ldots, \sigma^M_{NP}, \sigma^M_{Def})$ as an on-diagonal element. Then, at an appropriate determination time t, based on the estimated $x=(x^1_{NP}, x^1_{Def}, \ldots, x^M_{NP}, x^M_{Def})$, the following probabilities $p(s_t=NP|z, h_t, h_T^{STD})$ and $p(s_t=Def|z, h_t, h_T^{STD})$ are calculated.

$$p(s_t = NP | z, h_t, h_T^{STD}) = \frac{1}{Z_{NP}} N(\overline{\omega}_{1:t} x^i_{NP}; \mu^i_{NP}, \sigma^{i2}_{NP}) \qquad (6a)$$

$$p(s_t = Def | z, h_t, h_T^{STD}) = \frac{1}{Z_{Def}} N(\overline{\omega}_{1:t} x^i_{Def}; \mu^i_{Def}, \sigma^{i2}_{Def}) \qquad (6b)$$

In the formulae, $\overline{\omega}_{1:t}$ represents an average value of resonance frequencies obtained by the determination time t.

Finally, based on the tire attachment probability $p(z|h_T^{STD})$ and the probabilities $p(s_t=NP|z, h_t, h_T^{STD})$ and $p(s_t=Def|z, h_t, h_T^{STD})$, the posterior probabilities $p(s_t=NP|h_t, h_T^{STD})$ and $p(s_t=Def|h_t, h_T^{STD})$ are calculated.

Generally, since the Bayesian estimation requires a high calculation amount, it is frequently not realistic to obtain an exact solution. However, a fact that resonance frequency estimate values are based on the normal distribution can be used to assume this distribution for the likelihood function to use the Kalman filter to thereby analytically obtain an exact solution only by the computation of a very simple matrix. Thus even in an actual vehicle environment having a limited calculation resource, the present invention can be carried out easily. The only problem is that the calculations of the formulae (5), (6a), and (6b) requiring the evaluation of exponent functions are relatively heavy. However, it is sufficient for the tire attachment probability of the formula (5) to be calculated once at an end of the initialization and thus a prompt on-line calculation is not required. Thus, this problem can be solved by an implementation in which a background calculation is gradually performed while other processings is being performed for example. Furthermore, the calculation of the posterior probability of the formulae (6a) and (6b) requires, in the algorithm for determining a decreased pressure illustrated hereinafter, only the comparison of the magnitudes of probabilities, thus not requiring an accurate calculation of an exponent function. Specifically, only the logarithms at both sides of the formulae (6a) and (6b) may be considered and thus the problem of the calculation load can be solved.

When even the dispersion of resonance frequencies in the same type of tire due to the production tolerance or the like is considered, there is caused an excessively-wide dispersion of likeliness function $p(\omega_t|s_t, z)$ for which parameters should be determined in advance. This may cause a case where a desired performance cannot be achieved depending on the brand of the tire to be attached. On the other hand, it is empirically known that, in the case of the tires of the same brand, the pressure decrease sensitivity does not significantly change even when absolute values of resonance frequencies are different. Thus, another method also may be considered where the learning of the likelihood function is performed based on the data of the one type of tire only and, with regard to an actual vehicle, at the end of the initialization, the average value of the likelihood function $p(\omega_t|s_t, z)$ is offset so as to be the average value of the resonance frequencies obtained in the initialization $\overline{\omega}$ to thereby absorb the differences in the absolute value of resonance frequencies due to the production tolerance so that a decreased pressure can be effectively determined based on the difference in the pressure decrease sensitivity only. Specifically, after the initialization is completed and the tire attachment probability $p(z|h_T^{STD})$ is calculated based on the formula (5), an average value of the normal distribution constituting the likelihood function is caused to change as shown below.

$$\mu^i_{Def} \leftarrow \mu^i_{Def} + (\overline{\omega} - \mu^i_{NP}) \qquad (7a)$$

$$\mu^i_{NP} \leftarrow \overline{\omega} \qquad (7b)$$

By performing the above-described invention after offsetting the average value, a decrease pressure can be determined based on the distribution of the differences between the average value $\overline{\omega}$ of the resonance frequencies obtained at the initialization and the resonance frequencies $\omega_t$ obtained at the detection. This can consequently suppress the deteriorated performance due to the dispersion of the resonance frequencies among individual tires.

If the posterior probability $p(s_t|h_t, \omega^{STD})$ regarding the air pressure status $s_t$ is calculated based on the formula (2), the determination of a decreased pressure can be performed based on this. For example, an algorithm may be considered where an alarm is issued when $s_T$ at which the probability is highest shows a decreased pressure status at the determination time T set in advance. More specifically, this is an algorithm in which, when $s_t$ takes two values of "normal pressure" and "decreased pressure", then the probability of the normal pressure is compared with the probability of the decreased pressure to issue an alarm when the probability of the decreased pressure is higher. This is also an algorithm in which, when $s_t$ takes three values of "normal pressure", "slightly-decreased pressure", and "decreased pressure", whether an alarm is issued or not is determined depending on the air pressure status having the highest probability.

Alternatively, another algorithm also may be considered for a case where false alarm is more desirably avoided than no alarm. This algorithm determines whether to issue an alarm or not based on an expectation value regarding the probability of an appropriately-defined evaluation function. When the normal pressure probability of 0.4 and the decreased pressure probability of 0.6 were calculated for example, the above method will issue an alarm. However, when an expectation value is calculated by the evaluation function according to which the utility at which "normal pressure" is determined at normal pressure is 1, the utility at which "decreased pressure"

is erroneously determined at normal pressure is −10, the utility at which "normal pressure" is erroneously determined at decreased pressure is −2, and the utility at which "decreased pressure" is determined at decreased pressure is 1, then the expected utility to "alarming" can be calculated as 1×0.4+(−10)×0.4=−3.6 and the expected utility to "no alarming" can be calculated as −2×0.6+1×0.6=−0.6. Thus, even when the probability of a decreased pressure is high, the utility to "no alarming" is high. Thus, alarming can be passed over when it is difficult to avoid a false alarm only by a simple comparison of probabilities.

EXAMPLE AND COMPARATIVE EXAMPLE

Next, examples of the detection method of the present invention will be described. However, the present invention is not limited only to examples described hereinafter.

In order to confirm the effectiveness of the present invention, the invention was applied to the actual data extracted from an actual vehicle experiment and was evaluated. The data set used was obtained by the vehicle running on general roads and expressways in United States under various conditions (different conditions such as a running time, a road surface status, a running speed, and a movable load for example), including 50 types of data (among which 24 types of data are data under normal pressure conditions and the remaining 26 types of data are data under 25 percent-decreased pressure conditions). When assuming that arbitrary one type of normal pressure data (one type among the 24 types) was initialization data, another arbitrary one type of data (one type among the 50 types) was determination data, and the remaining 48 types of data were likelihood function learning data, the determination accuracy when all possible combinations thereof were evaluated (24×50=1200 evaluations) was evaluated. Furthermore, as a specific algorithm for determining a decreased pressure, a simple algorithm was used according to which $s_T$ at which the posterior probability p $(s_t|h_t, \omega^{STD})$ was maximum since 15 minutes has passed after the start of the determination was assumed as the current air pressure status.

[Conditions 1]

Figure 4:
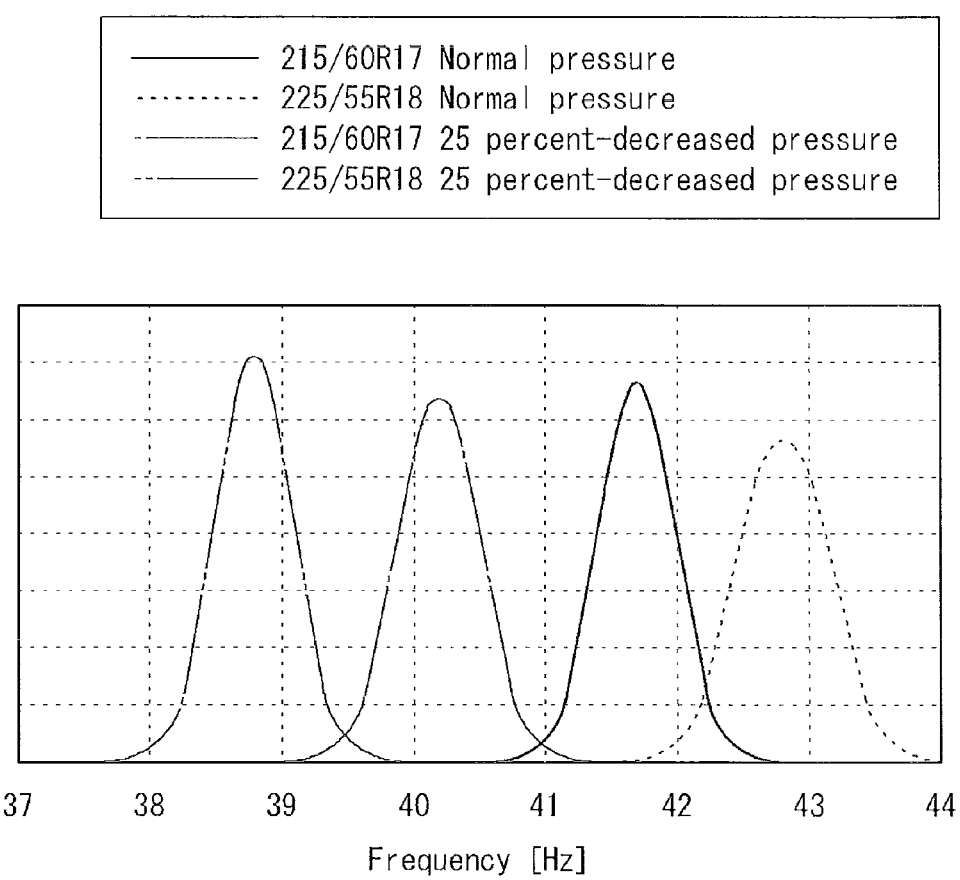
FIG. 4 illustrates the distribution of estimate resonance frequencies obtained by a method previously suggested by the present applicant (the prior application method) when there is a possibility where two types of tires may be attached to the vehicle.

Two types of tires were used. One of the tires was a 17-inch tire having a tread width of 215 millimeters and a tire profile of 60 percent. The other of the tires was an 18-inch tire having a tread width of 225 millimeters and a tire profile of 55 percent. The present inventors have found, based on the result of the repetition of actual vehicle experiments or the like, that the resonance frequencies of the two types of tires were 41.4 Hz and 42.7 Hz, respectively, and showed a change at a 25-percent decreased pressure of 3.0 Hz and 2.4 Hz, respectively. Specifically, these tires have different resonance frequencies at a normal pressure and different pressure decrease sensitivities and the respective resonance frequencies were estimated by the method previously-suggested by the present applicant (the estimation method shown in Japanese Patent Application No. 2008-129055 (the prior application method). This method includes: a step of estimating, based on the rotation speed (or acceleration) information obtained in a step of regularly detecting tire rotation speed information of the respective wheels of a vehicle, the frequency characteristic of the rotation speed (or acceleration) information; and a step of determining a decrease in the tire pressure based on the estimated frequency characteristic. The step of estimating the frequency characteristic includes: the first step of subjecting a time-series signal including the rotation speed (or acceleration) information to a time-series estimation to obtain parameters of a tertiary or more linear model; the second step of estimating, based on the estimated linear model and the rotation speed (or acceleration) information as an output signal of the linear model, an input signal to the linear model; the third step of identifying, based on the estimated input signal and the rotation speed (or acceleration) information, parameters of a linear model for which the order is reduced to the second order; and the fourth step for estimating, based on the identified parameters of the model for which the order is reduced to the second order, a resonance frequency in a tire torsional direction. Furthermore, in a step of determining a decrease in the tire pressure, based on the estimated resonance frequency in the tire torsional direction, a decrease in the tire pressure is determined). The distribution of the resonance frequencies estimated by this method is as shown in FIG. 4.

[Conditions 2]

Figure 5:
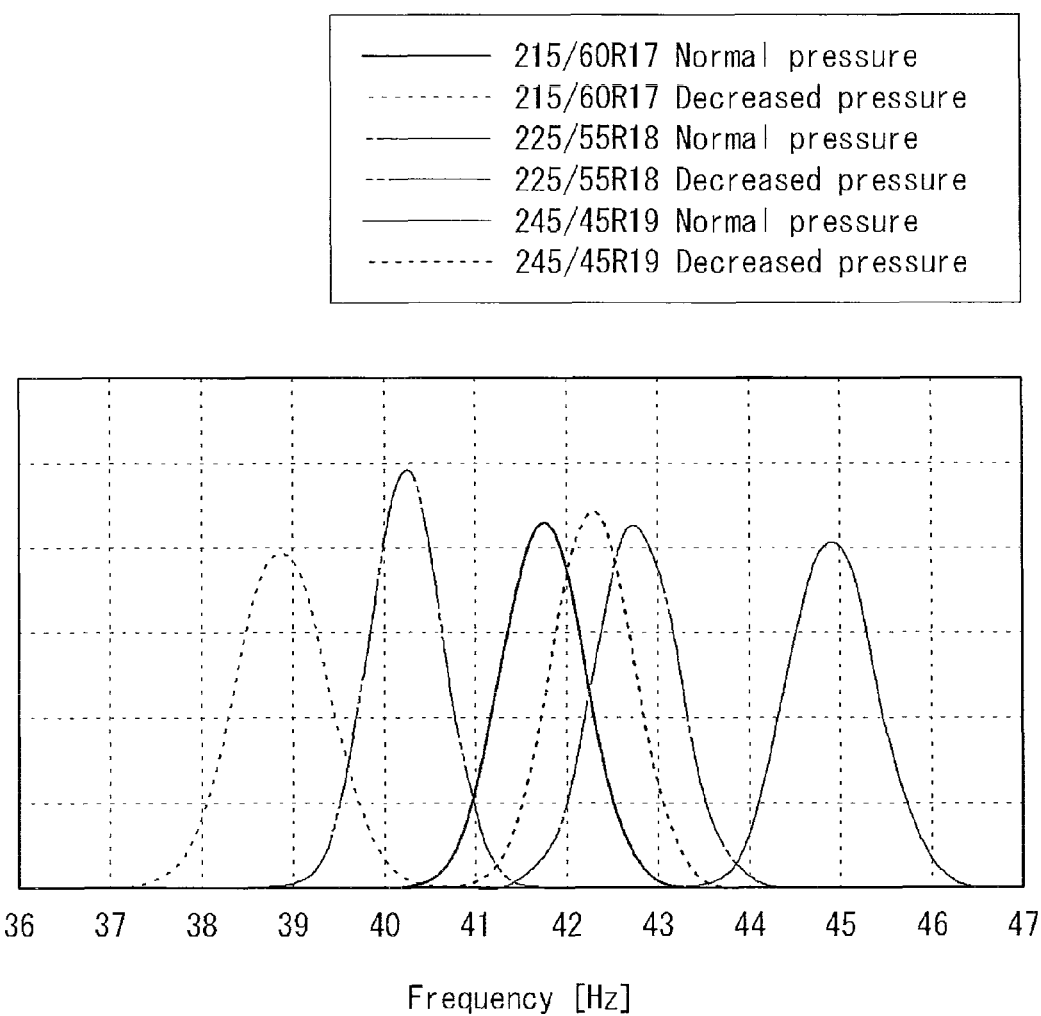
FIG. 5 illustrates the distribution of estimate resonance frequencies obtained by the prior application method when there is a possibility where three types of tires may be attached to the vehicle.

The tires used were changed to three types of tires of a 17-inch tire having a tread width of 215 millimeters and a tire profile of 60 percent, an 18-inch tire having a tread width of 225 millimeters and a tire profile of 55 percent, and a 19-inch tire having a tread width of 245 millimeters and a tire profile of 45 percent. It was confirmed that these three types of tires had resonance frequencies of 41.4 Hz, 42.7 Hz, and 44.9 Hz, respectively, and a change amount in the resonance frequency at a 25 percent-decreased pressure was 3.0 Hz, 2.4 Hz, and 2.6 Hz, respectively. Furthermore, the resonance frequency was estimated based on the prior application method as in the above section, the result of which is shown in FIG. 5.

[Conditions 3]

Figure 6:
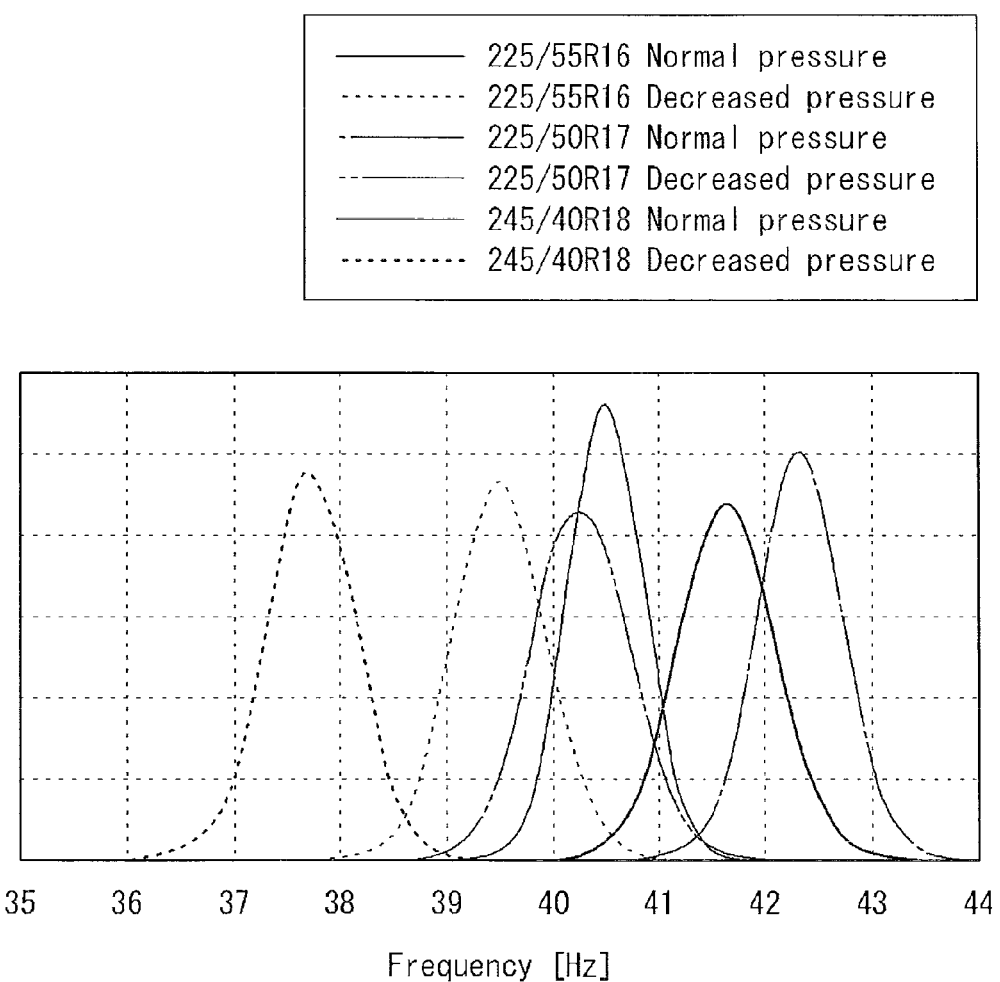
FIG. 6 illustrates the distribution of estimate resonance frequencies obtained by the prior application method when there is a possibility where other three types of tires may be attached to the vehicle.

The tires used were changed to three types of tires of a 16-inch tire having a tread width of 225 millimeters and a tire profile of 55 percent, a 17-inch tire having a tread width of 225 millimeters and a tire profile of 50 percent, and an 18-inch tire having a tread width of 245 millimeters and a tire profile of 40 percent. It was confirmed that these three types of tires had resonance frequencies of 41.6 Hz, 42.3 Hz, and 40.5 Hz, respectively, and a change amount in the resonance frequency at a 25 percent-decreased pressure was 2.1 Hz, 2.1 Hz, and 2.7 Hz, respectively. Furthermore, the resonance frequency was estimated based on the prior application method as in the above section, the result of which is shown in FIG. 6.

Figure 7:
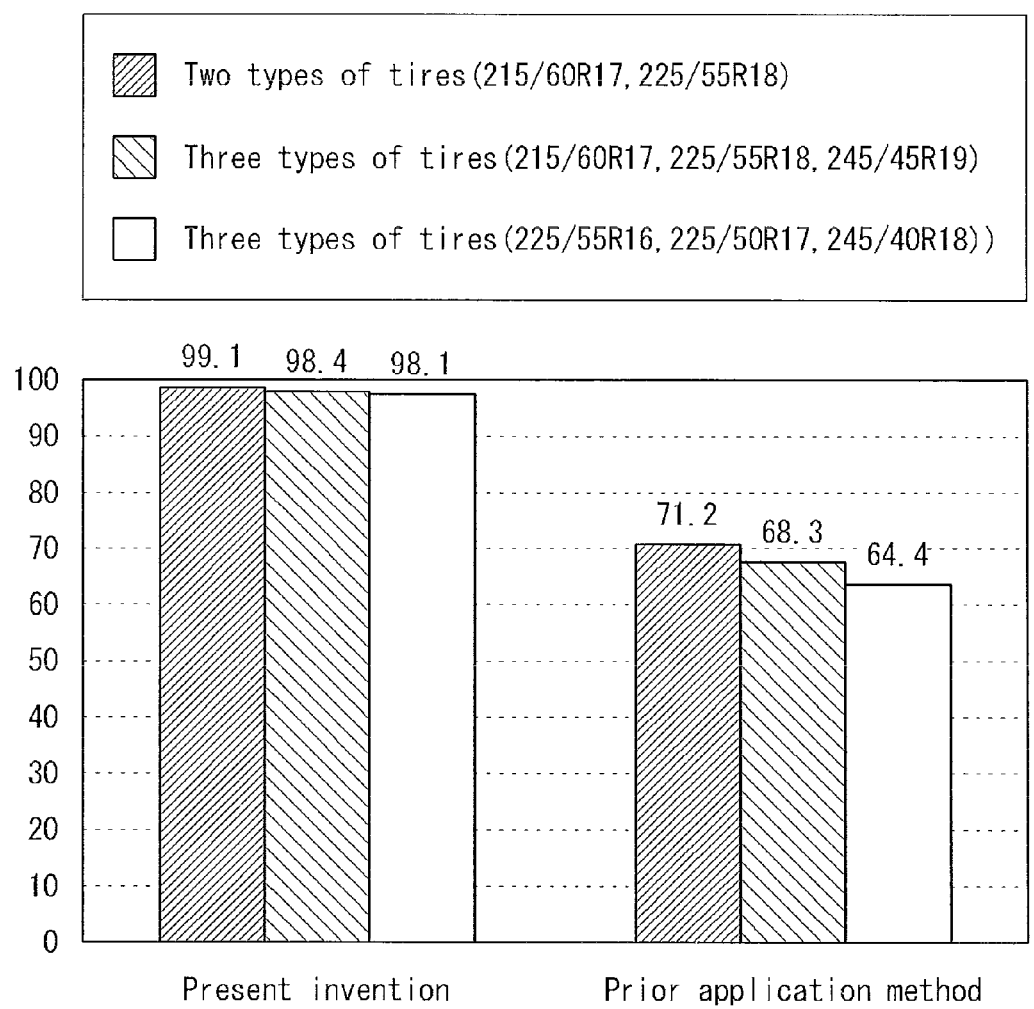
FIG. 7 illustrates the performances of the determination of a decreased pressure of the detection method of the present invention and the prior application method.

In the present experiment, in a situation where attached tires are uncertain (a situation where the system-side does not know which of a plurality of types of default tires specified by an automobile company is attached to the vehicle), the accuracy of the determination of a decreased pressure was evaluated, thereby obtaining the result of FIG. 7. The evaluation in FIG. 7 was carried out based on the correct answer rates to 1200 evaluation conditions different from one another (the rate of the correct determination ("normal pressure" is determined at "normal pressure" and "decreased pressure" is determined at "decreased pressure")). The correct answer rate was calculated based on the number of correct answers to the 1200 conditions. In the case of the present invention for which any of two types of tires was attached to the vehicle for example, the correct answer rate was 99.1, which means that false alarm or no alarm was caused under 11 conditions among 1200 conditions. In the case of the prior application method under the same conditions, the correct answer rate was 71.2, which means that false alarm or no alarm was caused under 346 conditions among 1200 conditions.

It can be understood that, although the prior application method cannot show a sufficient performance, the use of the present invention can substantially provide an appropriate determination of a decreased pressure. This remarkable difference in performance between the present invention and the prior application method is due to the reason as shown below. Specifically, in the case of the method of issuing an alarm when a difference between the reference frequency estimated at the initialization and the resonance frequency estimated at the current time exceeds a difference amount set in advance, the difference amount set in advance has only one value even when two types of tires have different pressure decrease sensitivities and thus false alarm or no alarm is frequently caused depending on the resonance frequency obtained at the initialization. When the resonance frequency obtained at the initialization is 42 Hz for example, the difference amount is set to 2.5 Hz for example to carry out the determination of a decreased pressure without considering separately a possibility where a 17-inch tire shows a resonance frequency close to a standard and a possibility where an 18-inch tire shows a slightly-lower resonance frequency. Thus no alarm is issued when the resonance frequency at the determination is 40 Hz, however, an alarm should be issued when the attached tires are 18 inch because a decreased pressure status is securely established. Even in the situation that cannot be handled by the prior application method as described above, the use of the present invention can carry out the determination of a decreased pressure in consideration of a plurality of different tires attached to the vehicle, thus issuing an alarm securely.

Although the two air pressure statuses were detected to the two types or three types of tires in the present example, the same method can be used to carry out the determination of a decreased pressure even with an increased types of tire or an increased number of air pressure statuses.

Furthermore, although the calculations shown in the formulae (7a) and (7b) are not carried out in the present example, substantially the same result also can be obtained when the calculations are carried out.

The invention claimed is:

1. An apparatus for detecting a tire having a decreased pressure based on resonance frequency of tires attached to respective wheels of a vehicle, comprising:
    a storage means for storing information regarding a distribution of resonance frequencies respectively corresponding to a plurality of air pressure statuses, the distribution being learned in advance;
    an initialization means for estimating, based on rotation speed information or rotation acceleration information regarding the tires at a normal internal pressure, a frequency characteristic of the rotation speed information or the rotation acceleration information;
    a frequency estimation means for estimating, based on running rotation speed information or rotation acceleration information regarding the tires in a running vehicle, a frequency characteristic of the rotation speed information or the rotation acceleration information; and
    a Bayesian estimation means for subjecting a tire pressure status at a certain time to a Bayesian estimation based on the resonance frequency during the initialization, a resonance frequency at the certain time obtained from the frequency estimation means, and distribution-related information stored in the storage means.

2. The apparatus for detecting a tire having a decreased pressure according to claim 1,
    wherein the Bayesian estimation means carries out a Bayesian estimation using a Kalman filter.

3. The apparatus for detecting a tire having a decreased pressure according to claim 1 or 2,
    wherein in order to reduce an influence by the dispersion of resonance frequencies among individual tires, the apparatus is configured to change an average value of a normal distribution constituting a likelihood function used for the Bayesian estimation.

4. The apparatus for detecting a tire having a decreased pressure according to claim 1,
    wherein the distribution-related information is an average and a dispersion of a normal distribution.

5. A method of detecting a tire having a decreased pressure based on resonance frequency of tires attached to respective wheels of a vehicle, comprising:
    a storage step of storing information regarding distribution of resonance frequencies respectively corresponding to a plurality of air pressure statuses, the distribution being learned in advance;
    an initialization step of estimating, based on rotation speed information or rotation acceleration information regarding the tires at a normal internal pressure, a frequency characteristic of the rotation speed information or the rotation acceleration information;
    a frequency estimation step of estimating, based on rotation speed information or rotation acceleration information regarding the tires in a running vehicle, a frequency characteristic of the rotation speed information or the rotation acceleration information; and
    a Bayesian estimation step of subjecting a tire pressure status at a certain time to a Bayesian estimation based on the resonance frequency during the initialization, a resonance frequency at the certain time obtained from the frequency estimation means, and the distribution-related information stored in the storage step.

6. The method of detecting a tire having a decreased pressure according to claim 5,
    wherein the Bayesian estimation step carries out a Bayesian estimation using a Kalman filter.

7. The method of detecting a tire having a decreased pressure according to claim 5 or 6,
    wherein in order to reduce an influence by the dispersion of resonance frequencies among individual tires, the method is configured to change an average value of a normal distribution constituting a likelihood function used for the Bayesian estimation.

8. The method of detecting a tire having a decreased pressure according to claim 5,
    wherein the distribution-related information is an average and a dispersion of a normal distribution.

9. A program for detecting a tire having a decreased pressure which causes, in order to detect a tire having a decreased pressure based on resonance frequency of tires attached to respective wheels of a vehicle, a computer to function as: a storage means for storing information regarding a distribution of resonance frequencies respectively corresponding to a plurality of air pressure statuses, the distribution being learned in advance; an initialization means for estimating, based on rotation speed information or rotation acceleration information regarding the tires at a normal internal pressure, a frequency characteristic of the rotation speed information or the rotation acceleration information; a frequency estimation means for estimating, based on rotation speed information or rotation acceleration information regarding the tires in a running vehicle, a frequency characteristic of the rotation speed information or the rotation acceleration information; and a Bayesian estimation means for subjecting a tire pressure status at a certain time to a Bayesian estimation based on the resonance frequency during the initialization, a resonance frequency at the certain time obtained from the frequency estimation means, and distribution-related information stored in the storage means.

* * * * *